(12) United States Patent
Bretthauer et al.

(10) Patent No.: US 12,470,874 B2
(45) Date of Patent: Nov. 11, 2025

(54) MEMS DEVICE AND METHOD FOR OPERATING A MEMS DEVICE

(71) Applicant: Infineon Technologies AG, Neubiberg (DE)

(72) Inventors: Christian Bretthauer, Munich (DE); Andreas Bogner, Munich (DE); Gabriele Bosetti, Munich (DE); Niccoló De Milleri, Villach (AT)

(73) Assignee: Infineon Technologies AG, Neubiberg (DE)

( * ) Notice: Subject to any disclaimer, the term of this patent is extended or adjusted under 35 U.S.C. 154(b) by 154 days.

(21) Appl. No.: 18/316,589

(22) Filed: May 12, 2023

(65) Prior Publication Data
US 2023/0396930 A1 Dec. 7, 2023

(30) Foreign Application Priority Data
Jun. 2, 2022 (EP) .................................... 22176931

(51) Int. Cl.
*H04R 17/00* (2006.01)
(52) U.S. Cl.
CPC ....... *H04R 17/00* (2013.01); *H04R 2201/003* (2013.01)
(58) Field of Classification Search
CPC .................................................... H04R 17/00
See application file for complete search history.

(56) References Cited

U.S. PATENT DOCUMENTS

| 6,216,059 | B1 | 4/2001 | Ierymenko | |
|---|---|---|---|---|
| 2006/0196280 | A1* | 9/2006 | Xi | G01L 1/08 |
| | | | | 73/862.625 |
| 2010/0097681 | A1 | 4/2010 | Klose et al. | |
| 2016/0219374 | A1* | 7/2016 | Hall | H04R 23/02 |
| 2016/0347605 | A1* | 12/2016 | Thompson | H01H 1/0036 |
| 2018/0234783 | A1* | 8/2018 | Clerici | H04R 3/002 |
| 2021/0206625 | A1 | 7/2021 | Paci et al. | |

FOREIGN PATENT DOCUMENTS

WO     0120287 A1     3/2001

* cited by examiner

*Primary Examiner* — Olisa Anwah
(74) *Attorney, Agent, or Firm* — Slater Matsil, LLP

(57) ABSTRACT

A MEMS device and a method for operating a MEMS device are provided. The MEMS device comprises a piezoelectric transducer element having at least a first piezoelectric transducer region and a deflectable structure, wherein the deflectable structure comprises the piezoelectric transducer element. The MEMS device further comprises a control circuitry configured to readout at least a first sensor signal from the first region of the piezoelectric transducer element based on a deflection of the deflectable structure. The control circuitry is further configured to determine a control signal from the readout first sensor signal, wherein the control signal has a counteracting effect to the deflection of the deflectable structure when provided to the piezoelectric transducer element. The control circuitry is configured to provide the control signal to the piezoelectric transducer element for counteracting the deflection of the deflectable structure.

21 Claims, 8 Drawing Sheets

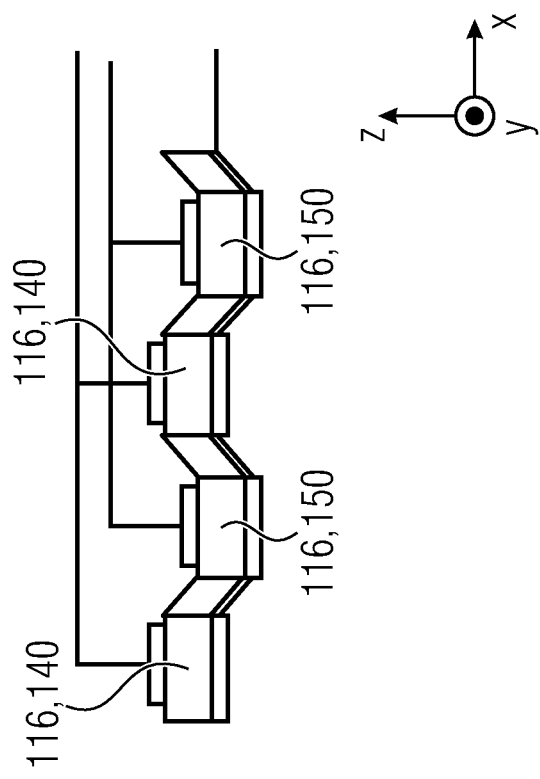
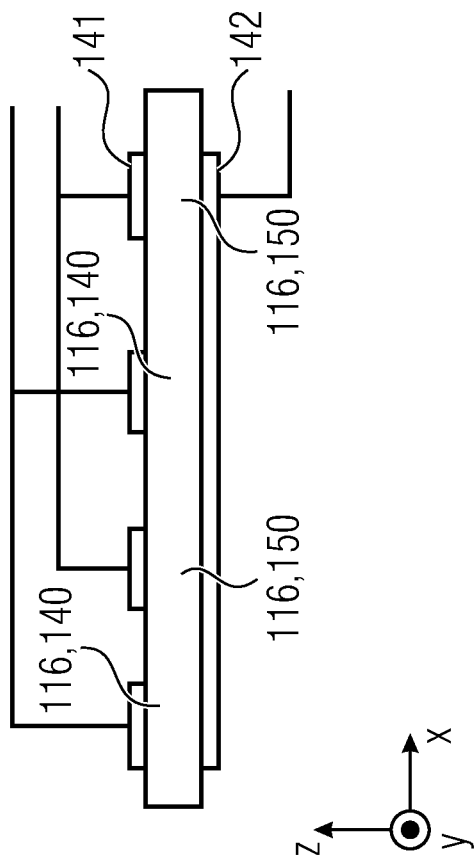
Fig. 2d
Fig. 2c

200

┌─────────────────────────────────────────────┐
│ Readout at least a first sensor signal from a first │
│ portion of a piezoelectric transducer element based │—202
│ on a deflection of a deflectable structure │
└─────────────────────────────────────────────┘

┌─────────────────────────────────────────────┐
│ Determine a control signal from at least the readout │
│ first sensor signal, wherein the control signal has │
│ a counteracting effect to the deflection of │—204
│ the deflectable structure when provided to │
│ the piezoelectric tranducer element │
└─────────────────────────────────────────────┘

┌─────────────────────────────────────────────┐
│ Provide the control signal to the piezoelectric │
│ transducer element for counteracting the deflection │—206
│ of the deflectable membrane structure │
└─────────────────────────────────────────────┘

Fig. 3

MEMS DEVICE AND METHOD FOR OPERATING A MEMS DEVICE

This application claims the benefit of European Patent Application No. 22176931, filed on Jun. 2, 2022, which application is hereby incorporated herein by reference.

TECHNICAL FIELD

Embodiments of the present disclosure relate to a MEMS (micro-electro-mechanical system) device and a method for operating a MEMS device.

BACKGROUND

Pressure and pressure changes in a fluid, e.g. a gas (like air) or a liquid, can be determined by measuring a deflection of a deflection structure in contact with the fluid. This principle is commonly applied in microphones and pressure sensors. A microphone enables translating deflections of a deflection structure caused by sound waves into an electrical signal. Such a deflection structure usually has a preferred operating position, wherein excessive deflection of the deflection structure can result in impairment of its performance. One way to reduce deflection is to increase a stiffness of the deflection structure. However, stiffer deflection structures tend to have unfavorable signal-to-noise ratios (SNR).

Therefore, there is a need in the field of deflection structure devices for reducing deflection of a deflectable structure.

SUMMARY

According to an embodiment, a MEMS device is provided. The MEMS device comprises a piezoelectric transducer element having at least a first piezoelectric transducer region and comprises a deflectable structure, wherein the deflectable structure comprises the piezoelectric transducer element. The MEMS device further comprises a control circuitry configured to readout at least a first sensor signal (e.g., a first voltage signal) from the first region of the piezoelectric transducer element based on a deflection of the deflectable structure. The circuit control is further configured to determine a control signal from the readout first sensor signal, wherein the control signal has a counteracting effect to the deflection of the deflectable structure when provided to the piezoelectric transducer element. The circuit control is configured to provide the control signal to the piezoelectric transducer element for counteracting (e.g., a reducing or dampening effect) the deflection of the deflectable structure.

According to a further embodiment, a method for operating a MEMS device is provided. The MEMS device comprises a piezoelectric transducer element having at least a first piezoelectric transducer region, a deflectable structure, wherein the deflectable structure comprises the piezoelectric transducer element and a control circuitry. The method comprises the following steps performed by the control circuitry: reading out at least a first sensor signal from the first region of the piezoelectric transducer element based on a deflection of the deflectable structure, determining a control signal from at least the readout first sensor signal, wherein the control signal has a counteracting effect to the deflection of the deflectable structure when provided to the piezoelectric transducer element, and providing the control signal to the piezoelectric transducer element for counteracting the deflection of the deflectable structure.

Thus, according to an embodiment, the deflection of the deflectable structure, e.g. a membrane structure, under acoustic pressure can be sensed with an AFE (AFE=analog front end) and a (e.g. fast=high bandwidth) feedback control loop can be used that applies a control voltage (causing a counter force) to the at least one piezoelectric transducer elements of the MEMS device, e.g. with the aim to keep the membrane structure at rest condition and, thus, dampen the signal at the sense electrode actively close to zero. The applied voltage can then be interpreted as the "new" sensor signal (=output signal for further processing).

BRIEF DESCRIPTION OF THE DRAWINGS

In the following, embodiments of the present disclosure are described in more detail with respect to the figures, in which:

FIG. 2c shows a cross sectional view of an embodiment of the deflectable membrane structure through terminals;

FIG. 2d shows a cross sectional view of an embodiment of the deflectable structure wherein the deflectable structure has at least partially a corrugated shape;

FIG. 3 shows a principal flow diagram for a method for operating the MEMS device according to a further embodiment;

Figure 1A:
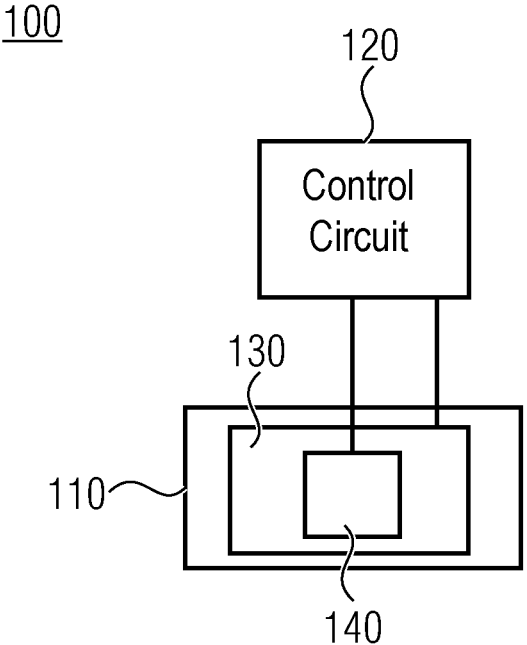
FIG. 1a shows a schematic illustration of a MEMS device comprising a deflectable structure and a control circuitry according to an embodiment.

In the following description, embodiments are discussed in further detail using the figures, wherein in the figures and the specification identical elements and elements having the same functionality and/or the same technical or physical effect are provided with the same reference numbers or are identified with the same name. Thus, the description of these elements and of the functionality thereof as illustrated in the different embodiments are mutually exchangeable or may be applied to one another in the different embodiments.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of semiconductor devices. The specific embodiments discussed are merely illustrative of specific ways to make and use the present concept, and do not limit the scope of the embodiments. In the following description of embodiments, the same or similar elements having the same function have associated therewith the same reference signs or the same name, and a description of such elements will not be repeated for every embodiment. Moreover, features of the different embodiments described hereinafter may be combined with each other, unless specifically noted otherwise.

In the description of the embodiments, terms and text passages placed in brackets are to be understood as further explanations, exemplary configurations, exemplary additions and/or exemplary alternatives.

It is understood that when an element is referred to as being "connected" or "coupled" to another element, it may be directly connected or coupled to the other element, or intermediate elements that may be present. Conversely, when an element is referred to as being "directly" connected to another element, "connected" or "coupled," there are no intermediate elements. Other terms used to describe the relationship between elements should be construed in a similar fashion (e.g., "between" versus "directly between", "adjacent" versus "directly adjacent", and "on" versus "directly on", etc.).

For facilitating the description of the different embodiments, some of the figures comprise a Cartesian coordinate system x, y, z, wherein the x-y-plane corresponds, i.e. is parallel, to a main surface region (e.g., a displaceable or deflectable structure) of a piezoelectric transducer (=a reference plane=x-y-plane), wherein the direction vertically up with respect to the reference plane (x-y-plane) corresponds to the "+z" direction, and wherein the direction vertically down with respect to the reference plane (x-y-plane) corresponds to the "−z" direction. In the following description, the term "lateral" means a direction parallel to the x- and/or y-direction or a direction parallel to (or in) the x-y-plane, wherein the term "vertical" means a direction parallel to the z-direction.

Some embodiments of the present disclosure relate to a MEMS (micro-electro-mechanical system) device, such as a MEMS device comprising a piezoelectric transducer and a deflectable structure. Further embodiments relate to a method for operating a MEMS device. In particular, some embodiments relate to an apparatus and a method for counteracting a deflection of the deflectable structure, such as a force feedback control of a piezoelectric transducer.

FIG. 1a shows a schematic illustration of a MEMS device 100 according to an embodiment. The MEMS device 100 comprises a deflectable structure 110 and a control circuitry 120. The deflectable structure 110 comprises a piezoelectric transducer element 130 having at least a first piezoelectric transducer region 140. The control circuitry 120 may be an ASIC (ASIC=application specific integrated circuit), a part of an ASIC or a stand-alone circuit.

Figure 1B:
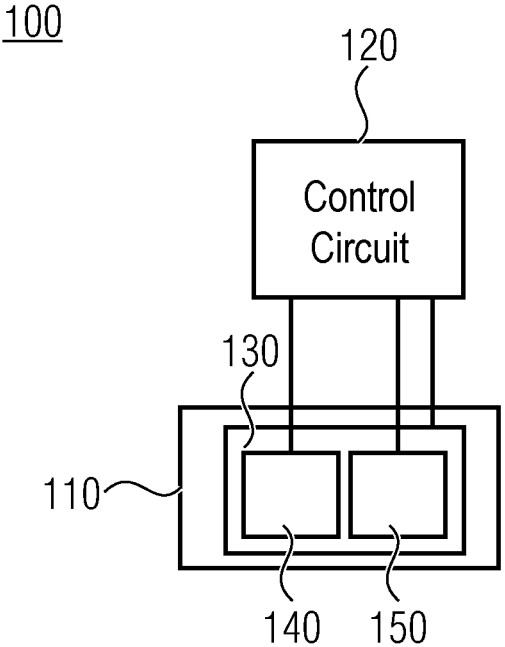
FIG. 1b shows a schematic illustration of a MEMS device comprising a first and second piezoelectric transducer region according to a further embodiment.

The MEMS device 100 depicted in FIG. 1a has a piezoelectric transducer element 130 with (only) the first piezoelectric transducer region 140. Alternatively, the piezoelectric transducer element 130 may have more than one piezoelectric transducer region such as (at least) two, such as two, three, four, or more piezoelectric transducer regions. FIG. 1b shows a MEMS device 100 according to a further embodiment, wherein the piezoelectric transducer element 130 has the first piezoelectric transducer region 140 and a second piezoelectric transducer region 150.

The first and second piezoelectric transducer regions 140, 150 may be provided as at least one of an actuator or a sensor. For example, the first piezoelectric transducer regions 140 may be an actuator and the second piezoelectric transducer regions 150 may be a sensor. Alternatively, at least one of the first and second piezoelectric transducer regions 140, 150 may be both, an actuator and a sensor. As a sensor, mechanical influences such as a deflection of the deflectable structure 110, cause the first and/or second piezoelectric transducer region 140, 150 to generate a voltage that is indicative of the mechanical influence. As an actuator, a voltage applied to the first and/or second piezoelectric transducer region 140, 150 causes a mechanical reaction such as a deflection (or a reduction of a deflection caused by pressure changes in a fluid) of the deflectable structure 110.

Thus, embodiments may relate to a MEMS device 100 having a piezoelectric transducer in form of an actuator or sensor, such as a piezoelectric MEMS loudspeaker, a piezoelectric MEMS pressure sensor or a piezoelectric MEMS microphone, for example.

The general concept of the piezoelectric effect and the inverse piezoelectric effect will be briefly described below with reference to FIG. 1e.

Figure 1C:
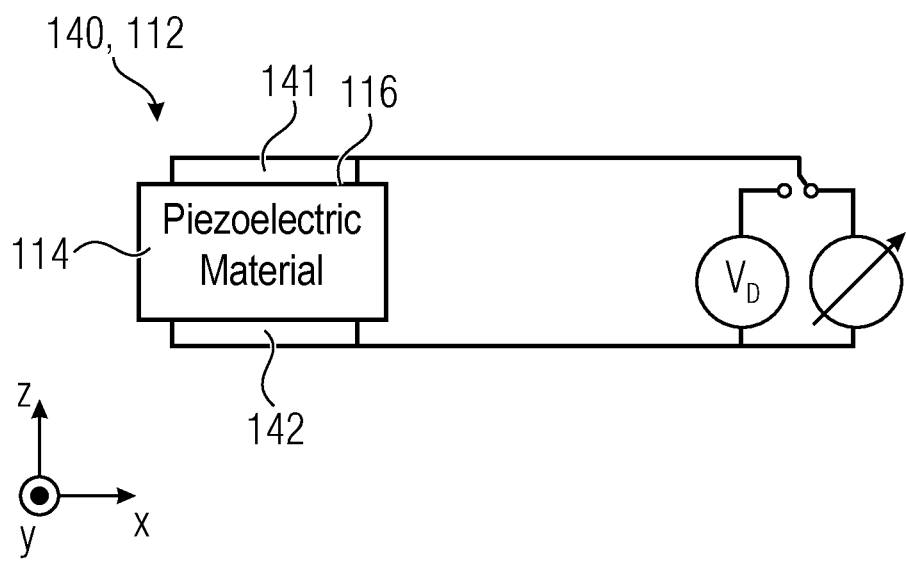
FIG. 1c shows a general piezoelectric device that may be used in the first piezoelectric transducer region according to a further embodiment.

FIG. 1c shows a piezoelectric device 116 according to a further embodiment that may be part of the first or second piezoelectric transducer region 140, 150. It is noted that FIG. 1 serves as an illustration for explaining the sensing and actuation function of a piezoelectric device 116. Functions of the first and/or second piezoelectric transducer regions 140, 150 related to a control signal for counteracting a deflection of the deflectable structure 110 will be described further below.

As shown in FIG. 1c, the piezoelectric device 116 has a piezoelectric (layer) structure 112 with a piezoelectric material 114 electrically contacted by a first readout terminal 141, e.g. a sense or control terminal, and a counter electrode 142, e.g. a bias terminal. A mechanical influence (e.g., changes in pressure, acceleration, temperature, strain, or force that can cause compression or stretching of the piezoelectric material 114) on the piezoelectric material 114 causes a charge difference and voltage difference at least one of which is measurable between the readout terminal 141 and the counter electrode 142. In the present disclosure, signals will be described in form of voltages or voltage differences. However, it is to be understood that at least one of the signals described herein may alternatively be represented by a charge difference or a current. The voltage difference is usually directly proportional to an applied force, pressure, or strain, i.e. to the force, pressure, or strain applied to the deflectable structure 110. The voltage difference can be determined directly between the readout terminal 141 and the counter electrode 142. Alternatively, a reference signal may be applied at the counter electrode 142 and the voltage difference across the piezoelectric material 114 may be determined based on a difference of a voltage between the readout terminal 141 and the reference signal.

Therefore, during a sensor operation of the piezoelectric device 116, the first readout terminal 141 forms a sense terminal for outputting a sense signal, wherein the sense signal is indicative of the mechanical influence on the piezoelectric material 114 (i.e., a piezoelectric effect). For an actuator operation, a voltage difference is applied between the readout terminal 141 and the counter electrode 142, causing mechanical deformation of the piezoelectric material 114 (i.e., an inverse piezoelectric effect). Again, a reference signal can be applied to one of the terminals 141, 142 and the voltage difference for actuation can be controlled by a voltage difference applied on the other one of the terminals 141, 142.

The first piezoelectric transducer region 140 may have one piezoelectric device 116 and, if a second piezoelectric transducer region 150 is provided, the second piezoelectric transducer region 150 may have one piezoelectric device 116. Alternatively, at least one of the first and second piezoelectric transducer regions 140, 150 may have more than one piezoelectric device 116.

In the example depicted in FIG. 1c, the terminals 141, 142 are arranged at opposite sides of the piezoelectric material 114. However, the terminals 141, 142 may be arranged on different sides of the piezoelectric material 114, such as on two surfaces of the piezoelectric material 114 that are oriented at 900 relative to each other or on the same surface of the piezoelectric material 114.

According an embodiment of the MEMS device 100, the control circuitry 120 comprises a feedback control loop for deriving (e.g., calculating by a processor or transforming by a circuitry of the control circuitry 120) the control signal from at least the readout first sensor signal (and optionally the second sensor signal) and for applying the control signal to the piezoelectric transducer element 130 (e.g., to at least one of the first and a second piezoelectric transducer region 140, 150). The control signal may be derived from an at least essentially linear function dependent on the first and/or second sensor signal (e.g., an amplification and/or inversion).

According an embodiment of the MEMS device 100, the control circuitry 120 comprises a feedback control loop to provide the control signal as a time dependent signal to the piezoelectric transducer element to actively dampen the deflection of the deflectable structure. The time dependent signal may comprise a non-harmonic time signal, for example. The time dependent signal may comprise a superposition of signals with at least two different frequencies. The time dependent signal may comprise a superposition of signals with a continuous spectrum of frequencies. The time dependent signal may be based on an inverted signal of the first sensor signal or the processed analog signal. The time dependent signal may have a controlled phase and amplitude for the piezoelectric transducer element to actively dampen the deflection of the deflectable structure.

According an embodiment of the MEMS device 100, the control circuitry 120 comprises an analog front end (AFE) circuitry for reading out the (first and second) sensor signal in an analog manner and providing a processed analog signal to the feedback control loop for determining the control signal. The AFE circuitry may comprise an analog amplifier (e.g., an operational amplifier).

According an embodiment of the MEMS device 100, the control signal comprises information indicative of the deflection of the deflectable structure 110 (e.g., indicative of an amplitude and/or frequency at a current moment or over time), wherein control circuitry 120 is further configured to derive an output signal of the MEMS device 100 from the control signal, and to provide the output signal having the information indicative of the deflection of the deflectable structure 110. The control circuitry 120 may be configured to transmit the output signal to an audio processing device (e.g., an audio encoder, a loudspeaker, or a recording device) that is comprised by or communicatively connected to the MEMS device 100. The audio processing device may be or be a part of a mobile phone, computer device, or headset. The control circuit 120 may have processing components that at least partially reverse signal processing of at least one of the AFE circuitry and the feedback control loop in order to derive the output signal. The output signal may be converted from an analog signal to a digital signal in an analog-to-digital converter.

According an embodiment of the MEMS device 100, the first transducer region 140 comprises a piezoelectric material 114 between a first readout terminal 141 and a counter electrode 142 and the second transducer region 150 comprises a piezoelectric material 114 between a second readout terminal and the counter electrode 142.

According an embodiment of the MEMS device 100, the piezoelectric transducer element 130 comprises a second transducer region 150, and wherein the control circuitry 120 is configured to readout the first sensor signal from the first region 140 of the piezoelectric transducer element 130 based on a deflection of the deflectable structure 110, to determine the control signal from the first sensor signal, and to provide the control signal to the second transducer region 150 of the piezoelectric transducer element 130 for counteracting the deflection of the deflectable structure 110.

According an embodiment of the MEMS device 100, the control circuitry 120 is configured to apply a reference signal to a counter electrode 142.

According an embodiment of the MEMS device 100, the control circuitry 120 is configured to readout the first sensor signal from the first region 140 of the piezoelectric transducer element 130 based on a deflection of the deflectable structure 110, to determine the control signal from the first sensor signal, and to provide the control signal to the first transducer region 140 of the piezoelectric transducer element 130 for counteracting the deflection of the deflectable structure 110, wherein the control circuitry 120 is configured to toggle between the reading out at least the first sensor signal from the first region of the piezoelectric transducer element 130 and the providing the control signal to the first transducer region 140.

According an embodiment of the MEMS device 100, the control circuitry 120 is configured to conduct the toggling in a MHz domain.

According an embodiment of the MEMS device 100, the control circuitry 120 is configured to apply a reference signal to a counter electrode 142.

According an embodiment of the MEMS device 100, the piezoelectric transducer element 130 comprises a second transducer region 150, and wherein the control circuitry 120 is configured to readout the first sensor signal from the first region 140 of the piezoelectric transducer element 130 and the second sensor signal from the second region 150 of the piezoelectric transducer element 130 based on a deflection of the deflectable structure 110, to determine the control signal from the readout first and the second sensor signal, and to provide the control signal to a counter electrode 142 of the piezoelectric transducer element 130 for counteracting the deflection of the deflectable structure 110.

According an embodiment of the MEMS device 100, the first transducer region 140 comprises a piezoelectric material between a first readout terminal 141 and a counter electrode 142 and the second transducer region 150 comprises a further piezoelectric material between a second readout terminal and the counter electrode 142, wherein the piezoelectric material between the first readout terminal 141 and the counter electrode 142 and the further piezoelectric material between the second readout terminal and the counter electrode 142 comprise an opposite pre-polarization.

Figure 2B:
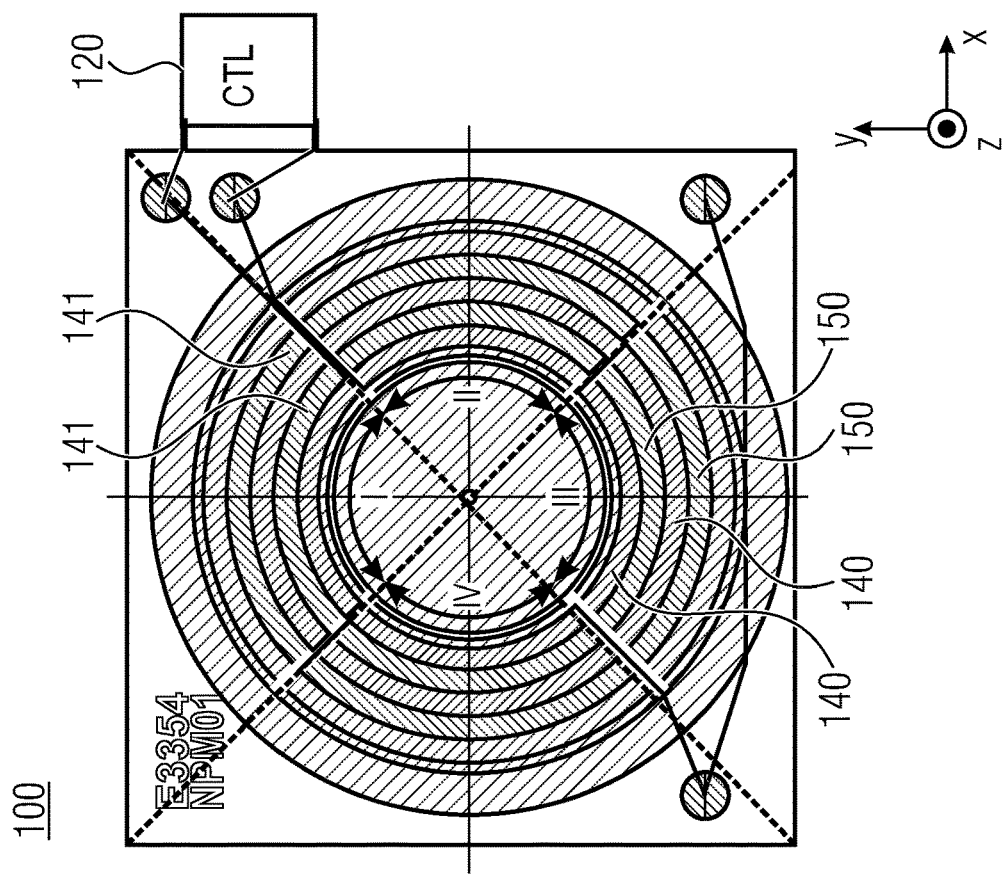
FIG. 2b shows a top view of a MEMS device with a segmented deflectable membrane structure having membrane segments according to a further embodiment.
Figure 2A:
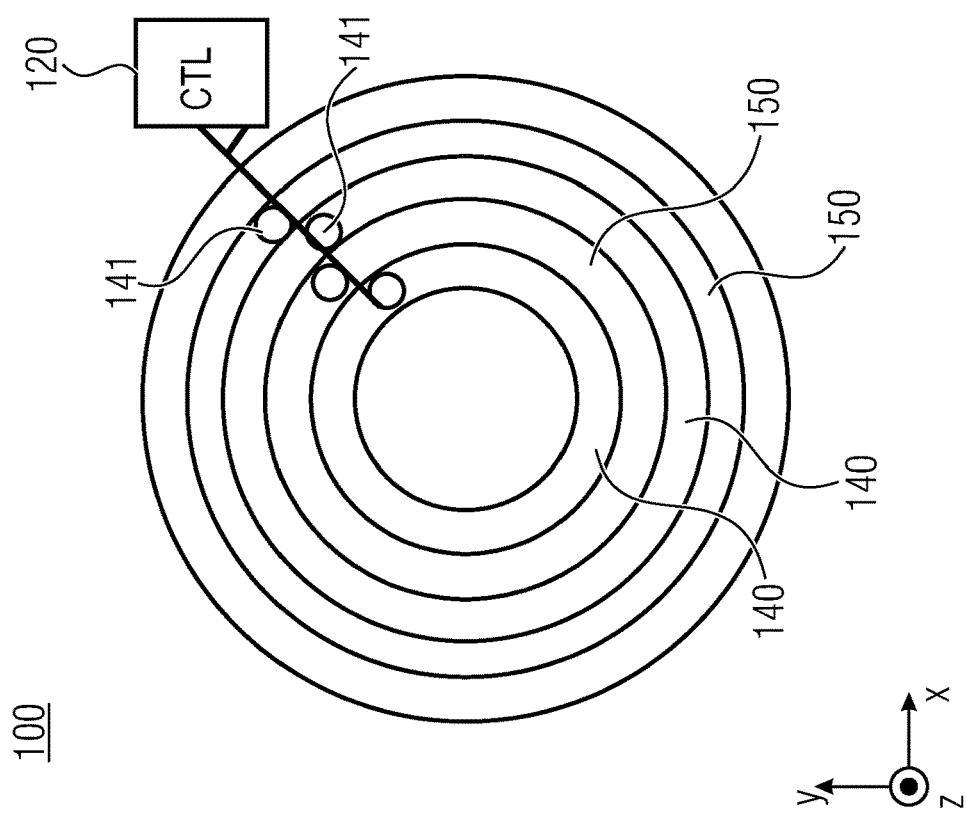
FIG. 2a shows a top view of a deflectable structure with a control circuitry according to a further embodiment.

FIG. 2a shows a top view of a deflectable structure 110 with a control circuitry 120 according to an embodiment, wherein the deflectable structure 110 comprises a membrane structure. The deflectable structure 110 may comprise (may be made) at least partially or completely (of) piezoelectric material. The membrane structure 110 may comprise a diaphragm (e.g., having a metallic, plastic, insulating or semiconductor material, e.g. poly-Si, etc.), wherein the first and second piezoelectric transducer regions 140, 150 are fixed (e.g., mechanically coupled or attached) to the diaphragm. The diaphragm may consist of or may comprise the piezoelectric material 114 of the first and second piezoelectric transducer regions 140, 150.

The piezoelectric layer or structure 112 may partially or completely cover a main surface region (e.g., front or back side) of the deflectable membrane structure 110, wherein the terminals 141, 142 cover partially or completely the piezoelectric layer or structure 112. The terminals 141, 142 may cover (partially or completely) the (active) areas of the piezoelectric layer or structure 112.

The embodiment shown in FIG. 2a comprises a in a circumferential direction continuous deflectable membrane structure 110. FIG. 2b shows a MEMS device 100 with a segmented deflectable membrane structure 110 having membrane segments I, II, III, IV and a segmented piezoelectric layer or structure 112 according to a further embodiment. The segmented piezoelectric layer or structure 112 has accordingly formed piezoelectric structure segments and may comprise segmented terminals 141, 142 having accordingly formed contact structure (contact layer) segments, wherein the (e.g., four) segments I, II, III and IV of the piezoelectric MEMS device 100 are serially connected. Alternatively, the four segments I, II, III, and IV may be connected with the control circuitry 120 in parallel, e.g., in order to be controlled individually.

According to an embodiment, the piezoelectric MEMS transducer region 140 may also comprise a continuous (not-segmented or one-piece) structure. The second piezoelectric transducer region 150 may (also) comprise a continuous (not-segmented or one-piece) structure.

The embodiments depicted in FIGS. 2a, b show a deflectable structure 110 that comprises a membrane structure, e.g., with a shape of a circular disk. However, the deflectable structure 110 is not limited thereto. For example, the deflectable structure 110 may comprise a cantilever structure, e.g., with a rectangular shape. The rectangular shape may have a plane shape or a corrugated shape along a direction of a short or long edge of the rectangular shape.

The term "deflectable structure" no is intended to illustrate that the deflectable structure 110 may comprise at least one or a plurality of different (piezoelectric, conductive and/or insulating) layers, such as a stack or layer sequence of different piezoelectric, conductive and/or insulating layers. A first portion of the deflectable structure 110 may have a thickness of about 1 μm or between 0.3 and 2 μm. A second portion of the deflectable structure 110 may have a thickness of about 0.1 μm (or between 0.05 and 0.5 μm).

FIG. 2c shows a cross sectional view of an embodiment of the deflectable membrane structure 110 through the terminals 141, 142. In the embodiment shown in FIG. 2c, the first and second piezoelectric transducer regions 140, 150 each have two piezoelectric devices 116. The first and second piezoelectric transducer regions 140, 150 may have any other number of piezoelectric devices 116 such as one, three, four, five, six, or more. The first and second piezoelectric transducer regions 140, 150 may have the same or a different number of piezoelectric devices 116. Each piezoelectric device 116 has a dedicated first readout terminal 141. In the embodiment shown in FIG. 2c, the piezoelectric devices 116 share a common counter electrode 142. As a result, a signal (such as a reference signal as will be described below) applied at the common counter electrode 142 is the same for all piezoelectric devices 116 that share the common counter electrode 142. Alternatively, at least one (e.g., all) piezoelectric devices 116 may have a separate counter electrode 142.

The piezoelectric devices 116 of a piezoelectric transducer region 140, 150 may have a common connection to and/or from the control circuitry 120. For example, if the deflectable structure 110 is mostly deflected in a low mode (e.g., a first and/or second fundamental mode), deflection differs little along dimensions of the deflectable structure 110. In such a case, sensor signals and control signals may be processed in combination (e.g., a single signal that combines the sensor signals of all piezoelectric device 116 of first and/or second piezoelectric transducer regions 140, 150). Processing signals in combination allows for an uncomplex control circuitry 120.

Alternatively, each (or at least some) piezoelectric device 116 may have an individual electrical connection to and/or from the control circuitry 120 for device specific signal processing. Individual signal processing for each piezoelectric device 116 allows reading out signals and/or providing control signals that better reflect or react to local changes in the deflection of the deflectable structure 110. If the deflectable structure 110 is deflected in higher modes, the deflection may differ greatly along dimensions of the deflectable structure 110. For such a case, sensor signals and control signals may be processed individually (e.g., such that for each sensor signal of a piezoelectric device 116 an individual control signal is determined). As a result, the control signal may cause a more accurate counter-action to the deflection of the deflectable structure 110.

The drawings of embodiment herein illustrate a common connection between the piezoelectric devices 116 and the control circuitry 120 for the sake of easier illustration, but do not limit the embodiments thereto.

FIG. 2d shows a cross sectional view of an embodiment of the deflectable structure no through terminals 141, 142, wherein the deflectable structure 110 has at least partially a corrugated shape (e.g., a wave pattern with a sinus shape or with circle segments having alternating curvatures). The deflectable structure 110 may have one corrugation or a corrugation (e.g., having at least one or a plurality of flutings). The piezo devices 116 of the first piezoelectric transducer region 140 are located at convex portions of the corrugated shape and piezo devices 116 of the second piezoelectric transducer region 150 are located at concave portions of the corrugated shape.

The MEMS device 100 described herein (such as the one shown in FIG. 1a or 1b) has a control circuitry 120 that is configured to perform a method for operating the MEMS device 100.

FIG. 3 shows a principal flow diagram 200 for a method for operating the MEMS device 100 according to a further embodiment. The method is performed by the control circuitry 120.

The method comprises, in step 202, reading out at least a first sensor signal from the first region 140 of the piezoelectric transducer element 130 based on a deflection of the deflectable structure 110. Optionally, the method may additionally comprise reading out a second sensor signal from the second region 150 of the piezoelectric transducer element 130 based on a deflection of the deflectable structure 110.

The method further comprises, in step 204, determining a control signal from at least the readout first sensor signal (and optionally the second sensor signal), wherein the control signal has a counteracting effect to the deflection of the deflectable structure 110.

The method comprises, in step 206, providing the control signal to the piezoelectric transducer element 130 for counteracting the deflection of the deflectable structure 110.

The control signal aims to keep the membrane (at least partially) at rest and thus dampens at least a first sensor signal actively close to zero. For example, a maximum of a velocity of the membrane structure (e.g., a maximum of sinusoidal velocity function) may be dampened by a factor between 2 and 20, e.g., between 4 and 8. The MEMS device 100 therefore realizes a force feedback control of piezoelectric transducer elements.

As a result, the deflectable structure 110 stays close to its optimal operating point.

The MEMS device 100 described herein comprises transducers that are piezoelectric. Compared to other transducers (e.g., an electromagnetic transducer), piezoelectric transducers are highly linear over a large bandwidth (e.g., 20 Hz to 20 kHz). Therefore, realizing a feedback loop over such a large bandwidth is easier to accomplish and may not even require digital signal processing. Therefore, the MEMS device 100 can be realized with a less complex control circuit 120.

Compared to common capacitor microphones, in a microphone comprising the MEMS device 100, no bias voltage (or a significantly lower bias voltage) is required. Therefore, the control signal does not have to be modulated on top of a (large) bias voltage, which lowers the power consumption of the microphone.

Since the deflection of the deflectable structure 110 can be reduced by the control circuitry 120 and the piezoelectric transducer element 130, a less stiff deflectable structure 110 can be used. As a result, the MEMs device 100 has increased sensor energy output and a better SNR. Deflectable structures 110 may exhibit unwanted resonance frequencies, which are smaller for less stiff deflectable structures. Therefore, a deflectable structure 110 with a reduced stiffness may exhibit resonance frequencies that fall within an operation frequency spectrum of the MEMS device 100 (e.g., an audio bandwidth lower than 20 kHz). However, the force feedback control of the MEMS device 100 may reduce (e.g., flatten) such resonance frequencies, further enabling the use of a less stiff deflectable structure 110, which improves the SNR and lowers power consumption.

System resonances of a microphone or a device comprising the microphone (e.g., a smartphone) may be flattened or suppressed. To this end, a manufacturer (e.g., that installs the MEMS device in a system) may be able to modify parameters that form a basis for generating the control signal. As a result, the MEMS device 100 can reduce resonance frequencies of a system comprising the MEMS device 100. The MEMS device 100 may therefore have an (improved) flat frequency response and/or an increased sound pressure level (SPL). In other words, system resonances such as the one caused by e.g. long sound channels in a smartphone, may be reduced (e.g., flattened) by giving a user (e.g., manufacturer of the smartphone) of a microphone comprising the MEMS device 100 access to control loop parameters (e.g., in an ASIC). This may enable the microphone to get closer to a true flat frequency response in a final application (e.g., the smartphone), and also increase a linearity at high sound pressure levels (SPL) in the application. For example, a microphone that has an acoustic overload point (AOP) at a sound pressure level (SPL) of 135 dB according to its datasheet, may achieve in an application only an SPL of 115 dB (with a considerable loss in SNR) due to system resonances. The force feedback control may reduce the system resonances, which may yield a higher AOP.

According to an embodiment of the MEMS device 100, the control circuitry 120 is configured to provide, to the piezoelectric transducer element 130, a test signal configured to cause a deflection of the deflectable structure 110, to readout a test response signal from at least the first region 140 of the piezoelectric transducer element 130 based on the deflection of the deflectable structure 110 caused by the test signal, and to adapt, based on the test response signal, parameters that form a basis for determining the control signal. The control circuitry 120 may be configured to generate the test signal upon a start-up of the MEMS device 100 (or of a device comprising the MEMS device 100). The MEMS device 100 may use the test signal to self-test in order to determine defects such as a membrane breakage or other malfunction. Adapting the parameters may include increasing an amplification or decreasing an amplification of the first sensor signal (e.g., in case a deflectability of the deflectable structure and/or response of the piezoelectric transducer element 130 changes over time).

In the following, further possible implementations of the MEMS device 100 are exemplarily described. In the present description of embodiments, the same or similar elements having the same structure and/or function are provided with the same reference numbers or the same name, wherein a detailed description of such elements will not be repeated for every embodiment.

Thus, the above description with respect to FIGS. 1a to 3 is equally applicable to the further embodiments as described below. In the following description, essentially the differences, e.g. additional elements, to the embodiment as shown in FIGS. 1a to 3 and the technical effect(s) resulting therefrom are discussed in detail.

Figure 4:
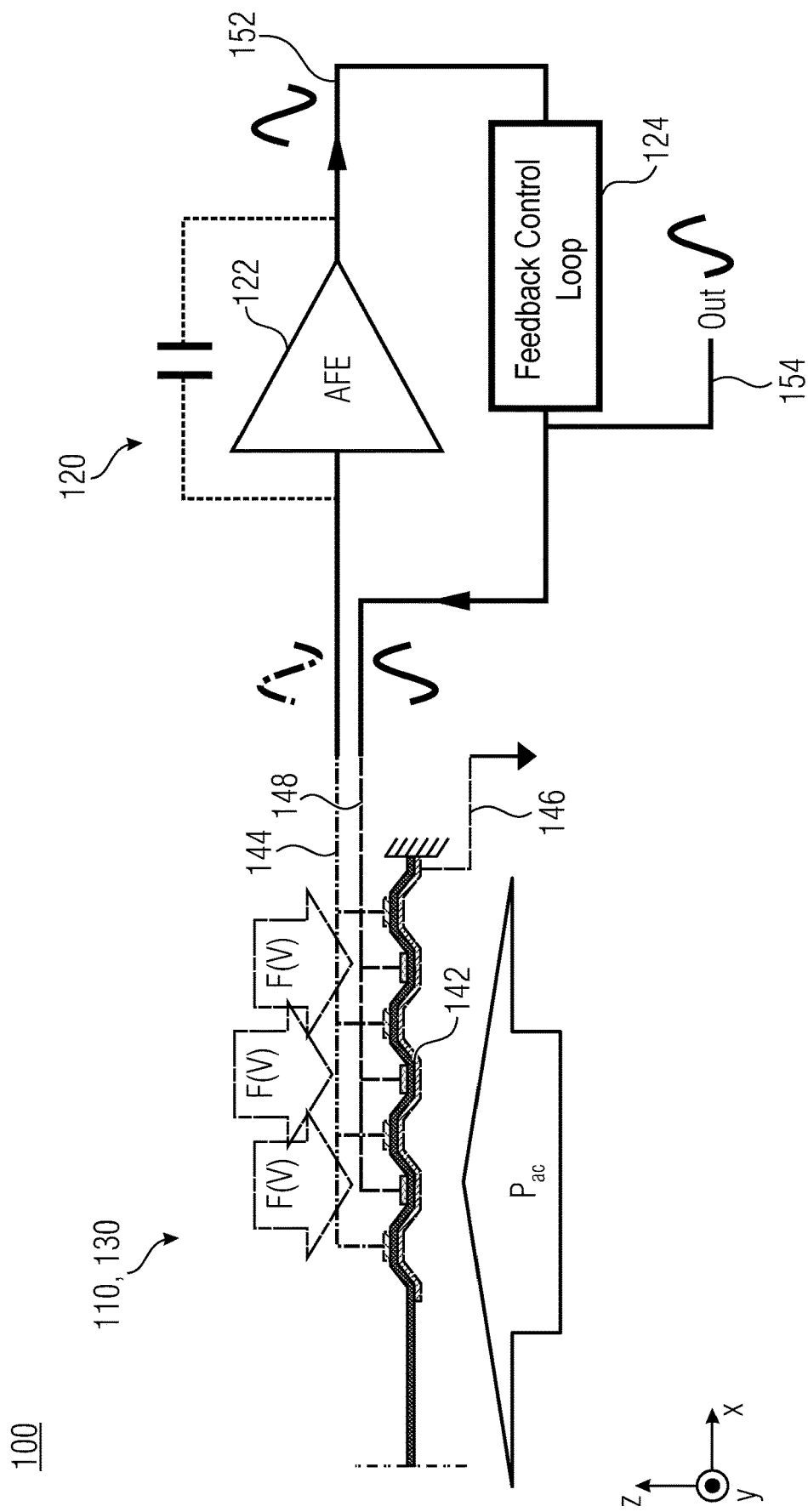
FIG. 4 shows a schematic illustration of the MEMS device according to a further embodiment.
Figure 5:
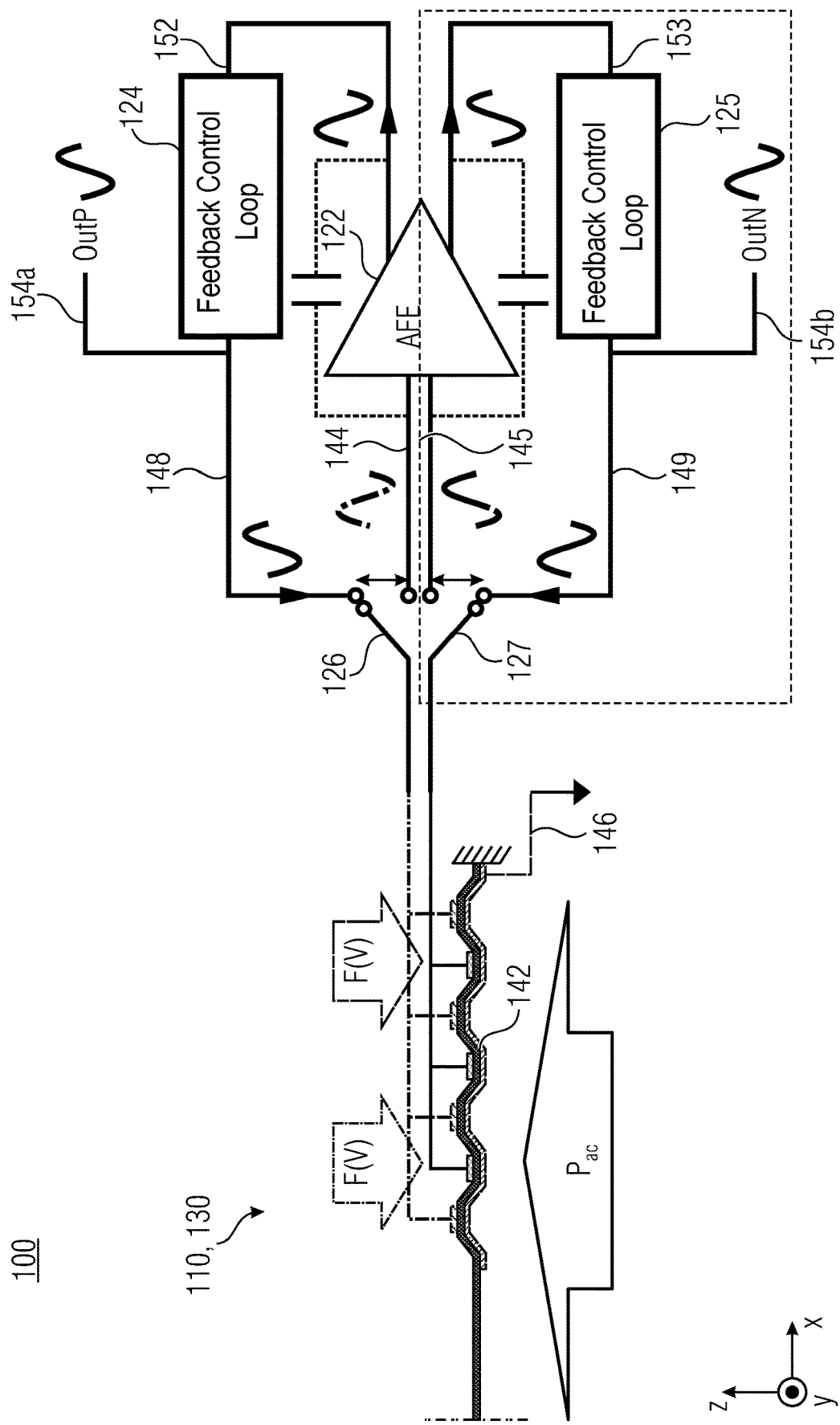
FIG. 5 shows a schematic illustration of the MEMS device according to a further embodiment.
Figure 6A:
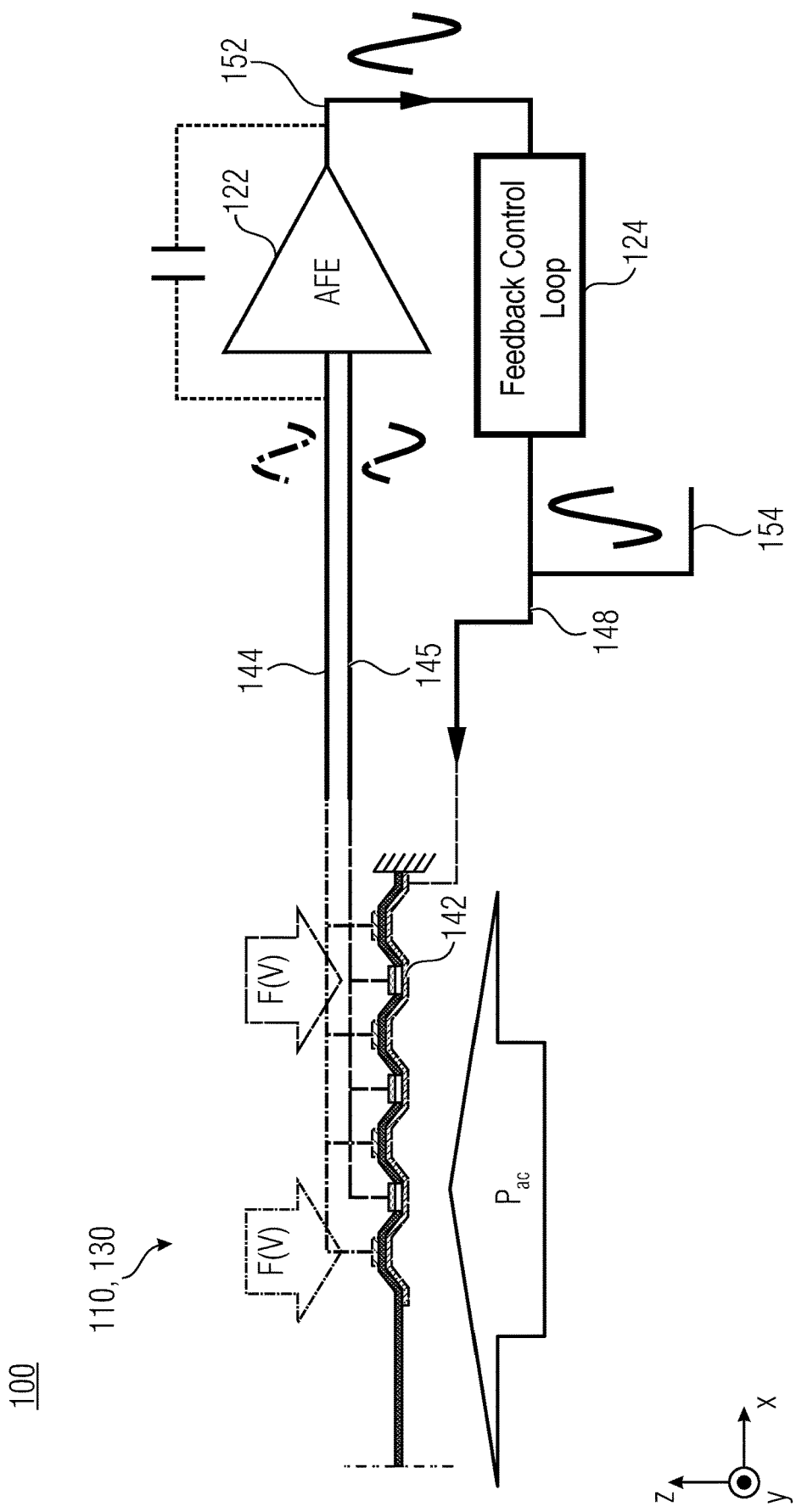
FIG. 6a shows a schematic illustration of the MEMS device according to a further embodiment.

In the further embodiments depicted in FIGS. 4, 5, and 6a, the deflectable structure 110 has a corrugated shape, but any other shape (e.g., a plane or spherical) may be used. Furthermore, a deflection of the deflectable structure 110 in a positive z-direction (i.e. in FIGS. 3, 4, and 5 upwards) is to be (at least partially) counteracted by a force actuating in a negative z-direction (i.e., downward). Vice versa, a deflection in a negative z-direction is the be counteracted by counteracting a force in a positive z-direction. However, other deflection directions and counteracting force directions may be possible. FIGS. 4, 5, and 6a show eight piezoelectric devices 116, wherein the individual piezoelectric devices 116 of the first and a second piezoelectric transducer region 140, 150 alternate in a radial direction. Furthermore, the piezoelectric devices 116 of the first piezoelectric transducer region 140 are arranged on elevated (in the z-direction) portions (i.e., with a convex curvature) of the corrugated deflectable structure 110 and the piezoelectric devices 116 of the second piezoelectric transducer region 150 are arranged on lowered (in the z-direction) portions (i.e., with a concave curvature) of the corrugated deflectable structure 110. However, any other arrangement and/or number of the piezoelectric devices 116 may be used instead.

FIG. 4 shows a schematic illustration of the MEMS device 100 according to a further embodiment.

The control circuitry 120 is configured to readout a first sensor signal 144 from the first portion 140 of the piezoelectric transducer element 130 based on a deflection of the deflectable structure 110. The first sensor signal 144 may be obtained only from the first portion 140 and not from the second portion 150 of the piezoelectric transducer element 130. To this end, control circuitry 120 may have a signal input only from the first portion 140 and not from the second portion 150 of the piezoelectric transducer element 130. Alternatively, the control circuitry 120 may be configured also receive a signal of the second piezoelectric transducer region 150, but ignore or discard the signal.

The control circuitry 120 may be configured to apply a reference signal 146 to the counter electrode 142. The control circuitry may be configured to apply a constant reference signal (e.g., a constant positive, negative voltage, ground potential, or a floating voltage) to the counter electrode 142. Alternatively, the reference signal may have a non-constant (i.e., variable) signal (e.g., due to a sampling rate or operating frequency of a power source).

The control circuitry 120 is further configured to determine a control signal 148 from the first sensor signal 144.

The control circuitry 120 is further configured to provide the control signal 148 to the second transducer region 150 of the piezoelectric transducer element 130 for counteracting the deflection of the deflectable structure 110.

The control signal 148 may be based on the first sensor signal 144 multiplied with minus one (i.e. signal inversion). The control signal 148 may be based on an amplification of the first sensor signal 144 by a first scaling factor. The first scaling factor may be pre-determined. The first scaling factor may be the same for all piezoelectric devices 116 of the first and/or second piezoelectric transducer region 140, 150. The first scaling factor may be dependent on a radial distance along the deflectable structure 110 of a piezoelectric device 116 that generated a portion of the first sensor signal 144 and/or a piezoelectric device 116 that receives the control signal 148. The control signal 148 may have a phase offset or phase inversion relative to the first sensor signal 144. The phase offset may be at least essentially identical for each piezoelectric device 116. Alternatively, the phase offset may be dependent on a radial distance along the deflectable structure 110 of a piezoelectric device 116 that generated a portion of the first sensor signal 144 and/or a piezoelectric device 116 that receives the control signal 148.

The control circuitry 120 may be configured to generate a processed analog signal based on the first sensor signal 144 (e.g., using an AFE circuitry) and to generate the control signal 148 based on the processed analog signal (e.g., using a feedback control loop).

In the embodiment depicted in FIG. 4, the control circuitry 120 comprises an AFE circuitry 122 for reading out the first sensor signal 144 in an analog manner and providing a processed analog signal 152 to a feedback control loop 124 for determining the control signal 148. The AFE circuitry 122 may comprise an analog amplifier such as an operational amplifier. The AFE circuitry 122 may be configured to process signals from at least two piezoelectric devices 116 individually. Alternatively, the AFE circuitry 122 may be configured to process a collective signal of all piezoelectric devices 116 of the first second piezoelectric transducer region 140. The AFE circuitry 122 may be configured to apply at least a part of the first scaling factor as described above. The control circuitry 120 may comprise a (at least one) capacitor element 123 connected in parallel to the AFE circuitry 122. The capacitor element 123 may be used in a charge or current read-out configuration of the AFE circuitry 122.

The control circuitry 120 depicted in FIG. 4 comprises a feedback control loop 124. The AFE circuitry 122 is configured to provide a processed analog signal 152 to the feedback control loop 124 for determining the control signal 148. The feedback control loop 124 may be configured to invert the processed analog signal 152 such as inverting of the processed analog signal 152 (i.e., multiplying an amplitude of the processed analog signal 152 with minus one). The feedback control loop 124 may be configured to apply a second scaling factor (additionally or alternatively to the first scaling factor). The first scaling factor applied by the AFE circuitry 122 may serve as a general signal amplification and the second scaling factor may scale the processed analog signal 152 to an intensity that corresponds to a required voltage that causes the second piezoelectric transducer region 150 to exert a force that at least partly counteracts the deflection of the deflectable structure 110.

The control circuitry 120 (e.g., the feedback control loop 124) may comprise a proportional-integral-derivative controller (PID controller). The PID controller may be configured to apply a signal correction (e.g., a signal correction of at least one of the first sensor signal 144 and the processed analog signal 152). The signal correction may comprise applying a scaling factor (e.g., the first and/or second scaling factor) and/or adding a correction signal. The signal correction may be based on an error value determined between a set point (i.e., desired value) of the first sensor signal 144 (or processed analog signal 152) and a received (i.e., measured value of) first sensor signal 144 (or processed analog signal 152). The signal correction may be based on at least one of a current value, an integration, and a derivative of the error value. The PID controller may realize a full PID closed-control loop.

The control signal 148 may comprise information indicative of the deflection of the deflectable structure 110 (e.g., a spectral information (=an information about the spectral content of the signal), a phase information and/or an information indicative of amplitude and/or frequency of the deflection at a current moment or over time, e.g. time interval), wherein control circuitry 120 is further configured to derive an output signal 154 of the MEMS device from the control signal 148, and to provide the output signal 154 having the information indicative of the deflection of the deflectable structure 110. The output signal 154 may be provided to an audio processing device as described above. The output signal 154 may be identical to the control signal 148. Alternatively, the output signal 154 may be a modified version of the control signal 148. To this end, the control circuitry 120 may be configured (e.g., by a modifying circuitry of the control circuitry 120) to process the control signal 148 in such a way as to at least partly revert processing steps applied to the first sensor signal 144 for deriving the control signal 148. For example, if the control circuitry 120 is configured to invert and/or amplify the first sensor signal 144 (or the processed analog signal 152), the control circuitry 120 may be configured to invert and/or deamplify the control signal 148 as at least one of the steps to derive the output signal 154 on the basis of the control signal 148.

The embodiment of the MEMS device 100 depicted in FIG. 4 allows for a continuous sensing and forcing on separate portions 140, 150 of the piezoelectric transducer element 130 and has low complexity, which reduces manufacturing costs. Lowering the resonance of the MEMS device 100 may compensate effects of the SNR caused by half of the piezoelectric transducer element 130 being used for sensing and half of it being used for forcing.

FIG. 5 shows a schematic illustration of the MEMS device 100 according to a further embodiment.

The control circuitry 120 is configured to readout the first sensor signal 144 from the first portion 140 of the piezoelectric transducer element 130 based on a deflection of the deflectable structure 110.

The embodiment depicted in FIG. 5 can be realized with only the first portion 140 of the piezoelectric transducer element 130, i.e. without a second portion 150 of the piezoelectric transducer element 130. However, for the sake of completeness, the embodiment shown in FIG. 5 will be described with an optional second portion 150 of the piezoelectric transducer element 130. The optional nature is further emphasized in FIG. 5 by a portion of the control circuitry 120 that is related to the second piezoelectric transducer element portion 150 being illustrated with a surrounding dashed border, indicating that said portion of the control circuitry 120 is optional. It should be understood, that the MEMS device 100 is not limited thereto.

The control circuitry 120 is configured to determine the control signal 148 from the first sensor signal 144 and a further (optional) control signal 149 from the second sensor signal 145 and to provide the control signal 148 to the first transducer region 140 of the piezoelectric transducer element 130 and the further control signal 149 to the (optional) second transducer region 150 of the piezoelectric transducer element 130 for counteracting the deflection of the deflectable structure 110.

The control circuitry 120 is configured to toggle between the reading out the first and second sensor signal 144, 145 from the first and second portion 140, 150 of the piezoelectric transducer element 130 and the providing the control signal 148 to the first transducer region 140 and the further control signal 149 to the second transducer region 150 of the piezoelectric transducer element 130.

To this end, the control circuitry may comprise a toggling element configured to repeatedly toggle between reading out the sensor signals 144, 145 (i.e., a reading state) and providing the control signals 148 (i.e., a controlling state). For example, the toggling element may comprise a first toggle switch 126 and a second toggle switch 127. The first toggle switch 126 is configured to toggle between reading out the first sensor signal 144 from the first portion 140 of the piezoelectric transducer element 130 and providing the control signal 148 to the first transducer region 140 of the piezoelectric transducer element 130. The second toggle switch 127 is configured to toggle between reading out the second sensor signal 145 from the second portion 150 of the piezoelectric transducer element 130 and providing the further control signal 149 to the second transducer region 150 of the piezoelectric transducer element 130.

The first and second toggle switches 126, 127 may be configured to conduct the toggling at the same frequency or at different frequencies (e.g., due to an inhomogeneous mass distribution of the deflectable structure 110 or different amount of masses moved by different transducer regions 140, 150). At least one of the first and second toggle switches 126, 127 may be configured to conduct the toggling in a MHz domain (e.g., between 10 MHz and 900 MHz such as between 300 MHz and 700 MHz).

When the first toggle switch 126 is in the reading state, the first sensor signal 144 can be received by an AFE circuitry 122, which is configured to provide a first processed analog signal 152 to a feedback control loop 124 for determining the control signal 148. When the first toggle switch 126 is in the controlling state, the control signal 148 can be received by the first piezoelectric transducer region 140.

Similarly, when the second toggle switch 127 is in the reading state, the second sensor signal 145 can be received by the AFE circuitry 122, which is configured to provide a second processed analog signal 153 to a further feedback control loop 125 for determining the further control signal 149. When the second toggle switch 127 is in the controlling state, the further control signal 149 can be received by the second piezoelectric transducer region 150.

It is noted that in FIG. 5, the control circuitry 120 comprises a single AFE circuitry 122 configured to process both, the first and second sensor signals 144, 145. Alternatively, an additional AFE circuitry may be provided for processing only one of the first and second sensor signals 144, 145. Furthermore, the control circuitry 120 shown in FIG. 5 comprises two feedback control loops 124, 125 for processing the processed analog signals 152, 153. Alternatively, the control circuitry 120 may comprise a single feedback control loop for processing the processed analog signals 152, 153.

The AFE circuitry 122 of the embodiment shown in FIG. 5 may be configured to perform similar signal processing as the AFE circuitry 122 of the embodiment shown in FIG. 4, such as combined signal processing, individual signal processing, and signal amplification.

The feedback control loops 124, 125 of the embodiment shown in FIG. 5 may be configured to perform similar signal processing as the control loop 124 of the embodiment shown in FIG. 4, such as such as combined signal processing, individual signal processing, signal amplification, and signal inversion.

Similarly to the embodiment shown in FIG. 4, the control signal 148 may comprise information indicative of the deflection of the deflectable structure 110, wherein control circuitry 120 is further configured to derive an output signal 154 of the MEMS device from the control signal 148, and to provide the output signal 154 having the information indicative of the deflection of the deflectable structure 110. The control signal 154 comprise a first control signal 154a derived (or being identical to) the control signal 148 and a second control signal 154b derived (or being identical to) the further control signal 149. The control circuit 120 may be configured to combine the first and second control signals 154a, 154b. To this end, the first and second control signals 154a, 154b may be summed up directly or modified (e.g., changed in at least one of phase, amplitude, and polarity), such as inverted, before combining. Modifying of at least one of the first and second control signals 154a, 154b may be based on the toggle frequencies of the first and second toggle switches 126, 127.

The MEMS device 100 according to the embodiment depicted in FIG. 5 enables the first and a second piezoelectric transducer region 140, 150 to alternate in quick succession between sensing and actuating. Therefore, the piezoelectric device 116 of the first and a second piezoelectric transducer region 140, 150 may act both, as sensor and counteractor of the deflection of the deflectable structure 110. The toggling element is preferably configured to toggle at a toggling frequency that is larger than a deflection frequency at which the deflectable structure 110 is deflected. For example, if the deflectable structure 110 were to be used in a microphone, the deflectable structure 110 is usually deflected at a deflection frequency between 1 Hz and 100 kHz or between 20 Hz and 20 kHz. A control circuitry 120 that is configured to conduct the toggling in a MHz domain exceeds such deflection frequencies and therefore enables timely counteraction of the deflection of the deflectable structure 110.

The embodiment of the MEMs device 100 depicted in FIG. 5 allows sensing with both, the first and a second piezoelectric transducer region 140, 150. Therefore, the MEMS device 100 provides an increased amount of sensor energy.

FIG. 6a shows a schematic illustration of the MEMS device 100 according to a further embodiment.

The control circuitry 120 depicted in FIG. 6a is configured to readout a first sensor signal 144 from the first portion 140 of the piezoelectric transducer element 130 and a second sensor signal 145 from a second portion 150 of the piezoelectric transducer element 130 based on a deflection of the deflectable structure 110. The control circuitry 120 is further configured to determine a control signal 148 from the readout first and the second sensor signal 144, 145, and to provide the control signal 148 to a counter electrode 142 of the piezoelectric transducer element 130 for counteracting the deflection of the deflectable structure 110.

However, the piezoelectric devices 116 of the first and second piezoelectric transducer regions 140, 150 may be configured to generate signals with different characteristics. For example, in the case of a corrugated deflectable structure 110, the first and the second sensor signal 144, 145 may be inverse signals of each other (with at least similar or different absolute amplitudes). FIG. 6a shows an embodiment of a MEMS device 100 with a corrugated deflectable structure 110. Piezoelectric devices 116 of the first piezoelectric transducer region 140 are arranged at elevated (in the z-direction) portions of the corrugated deflectable structure 110 and piezoelectric devices 116 of the second piezoelectric transducer regions 150 are arranged at lowered (in the z-direction) portions of the corrugated deflectable structure 110. As a result, the piezoelectric devices 116 of the first and the second piezoelectric transducer regions 140, 150 are arranged on portions of the deflectable structure 110 with first and second curvatures, wherein the first curvature and the second curvature are opposites of each other. During a deflection of the deflectable structure 110, piezoelectric devices 116 at the first curvature may therefore compress when piezoelectric devices 116 at the second curvature stretch and vice versa. As a result, the first and the second sensor signal 144, 145 may have at least similar characteristics such as absolute amplitude and frequency, but differ in other characteristics as polarity, i.e. be inverse signals of each other.

Figure 6B:
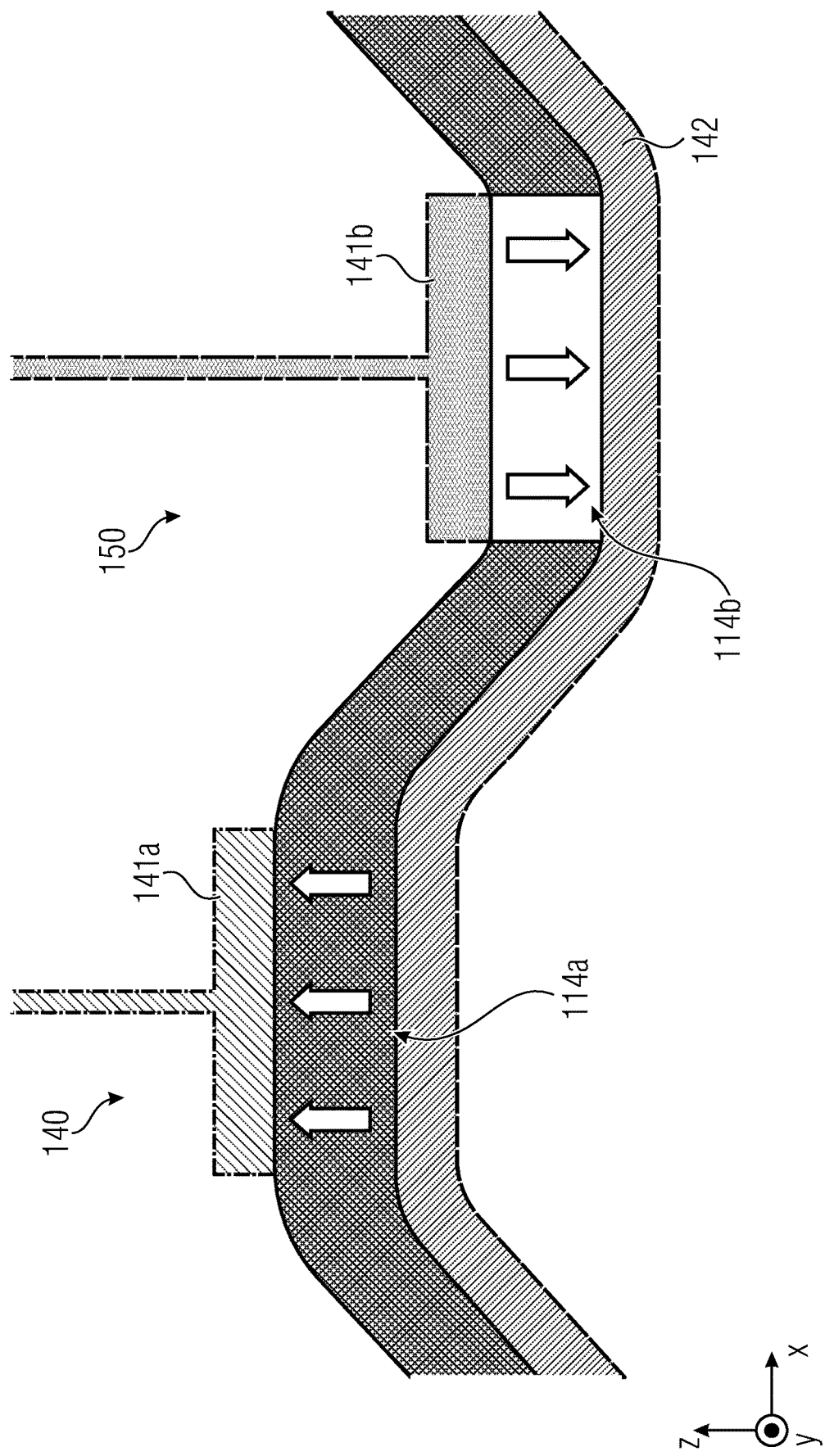
FIG. 6b shows a schematic (close up) cross-sectional view of a first and second transducer region according to a further embodiment.

The reverse signals may be compensated by opposite pre-polarizations of the piezoelectric devices 116. FIG. 6b shows a schematic (close up) cross-sectional view of a first and second transducer region 140, 150 according to a further embodiment. As can be seen in FIG. 6b, the first transducer region 140 comprises a piezoelectric material 114a between a first readout terminal 141a and a counter electrode 142 and the second transducer region 150 comprises a further piezoelectric material 114b between a second readout terminal 141b and the counter electrode 142, wherein the piezoelectric material 114a between the first readout terminal 141a and the counter electrode 142 and the further piezoelectric material 114b between the second readout terminal 141b and the counter electrode 142 comprise an opposite pre-polarization. As a result, the same type of strain (e.g., compression) on the first and second transducer region 140, 150 results in opposite electric fields within the piezoelectric material 114a and the and the further piezoelectric material 114b. Therefore, the same type of strain causes opposite voltage signals at the first and second readout terminals 141a, 141b. Conversely, opposite type of strain causes the same of similar voltage signals voltage signals at the first and second readout terminals 141a, 141b.

Therefore, the opposite pre-polarization of the piezoelectric material 114a and the further piezoelectric material 114b at least partially cancel out the opposite strain caused by the first and second curvatures at the piezoelectric material 114a and the further piezoelectric material 114b. As a result, the first and second sensor signal 144, 145 have the same or at least similar characteristics (i.e., not inverse signals of each other).

As described above for the embodiment with the flat shaped deflectable structure 110, the first and the second sensor signal 144, 145 may subsequently be combined (e.g., shorted) in or before an AFE circuitry 122, which is configured to provide a processed analog signal 152 (e.g., an amplified version of a combination of the first and second sensor signal 144, 145) to a feedback control loop 124 for determining the control signal 148 (e.g., an inverted version of the analog signal 152).

The AFE circuitry 122 of the embodiment depicted in FIG. 6a may be configured to perform similar signal processing as the AFE circuitry 122 of the embodiments shown in FIGS. 4 and 5, such as combined signal processing and signal amplification.

The feedback control loop 124 of the embodiment shown in FIG. 6A may be configured to perform similar signal processing as the control loops 124, 125 of the embodiments shown in FIGS. 4 and 5, such as combined signal processing, signal amplification, and signal inversion.

Similarly to the embodiment shown in FIGS. 4 and 5, the control signal 148 may comprise information indicative of the deflection of the deflectable structure 110, wherein control circuitry 120 is further configured to derive an output signal 154 of the MEMS device from the control signal 148, and to provide the output signal 154 having the information indicative of the deflection of the deflectable structure 110.

The opposite pre-polarization of the piezoelectric material 114a and the further piezoelectric material 114b also causes force in opposite directions, i.e. not only reverses a sensing signal but also reverse a force caused by an applied signal. As a result, the opposite pre-polarization of the piezoelectric material 114a and the further piezoelectric material 114b at least partially compensates different actuation responses caused by the opposite curvatures at the piezoelectric material 114a and the further piezoelectric material 114b. Therefore, the control signal 148 applied at the counter electrode 142 is translated in an actuation that correctly counteracts the deflection for both, the first and second piezoelectric transducer regions 140, 150.

The embodiment shown in FIG. 6a allows sensing with both, the first and second piezoelectric transducer regions 140, 150, without requiring a complex control circuitry 120. The embodiment shown in FIG. 6a realizes separate sense and force electrodes 141a, 141b with bipolar piezoelectric materials 114a, 114b. As the polarization of the piezo materials 114a, 114b is locally flipped by 180°, then the first and second sensor signals 144, 145 become in-phase (e.g., not differential anymore) and the reference electrode 142 can now be used to generate a force that is pointing in the same direction on both areas of the electrodes 141a, 141b. The AFE may sum up the first and second sensor signals 144, 145 (e.g., shorting them). As a result, sensing and forcing can run continuously. The MEMS device 100 is able to use the full sensor energy of the piezoelectric transducer element, which improves the SNR.

Additional embodiments and aspects are described which may be used alone or in combination with the features and functionalities described herein.

According to an embodiment, a MEMS device comprises a piezoelectric transducer element having at least a first piezoelectric transducer region, a deflectable structure, wherein the deflectable structure comprises the piezoelectric transducer element, and a control circuitry configured to readout at least a first sensor signal from the first region of the piezoelectric transducer element based on a deflection of the deflectable structure, determine a control signal from the readout first sensor signal, wherein the control signal has a counteracting effect to the deflection of the deflectable structure when provided to the piezoelectric transducer element, and provide the control signal to the piezoelectric transducer element for counteracting the deflection of the deflectable structure.

According to an embodiment, the control circuitry comprises a feedback control loop for deriving the control signal from at least the readout first sensor signal and for applying the control signal to the piezoelectric transducer element.

According to an embodiment, the control circuitry comprises a feedback control loop to provide the control signal as a dependent signal to the piezoelectric transducer element to actively dampen the deflection of the deflectable structure.

According to an embodiment, wherein the control circuitry comprises an analog front end, AFE, circuitry for reading out the sensor signal in an analog manner and providing a processed analog signal to the feedback control loop for determining the control signal.

According to an embodiment, the control signal comprises an information indicative of the deflection of the deflectable structure, wherein control circuitry is further configured to derive an output signal of the MEMS device from the control signal, and to provide the output signal having the information indicative of the deflection of the deflectable structure.

According to an embodiment, the first transducer region comprises a piezoelectric material between a first readout terminal and a counter electrode and the second transducer region comprises a piezoelectric material between a second readout terminal and the counter electrode.

According to an embodiment, the control circuitry is further configured to provide, to the piezoelectric transducer element, a test signal configured to cause a deflection of the deflectable structure, readout a test response signal from at least the first region of the piezoelectric transducer element based on the deflection of the deflectable structure caused by the test signal, and adapt, based on the test response signal, parameters that form a basis for determining the control signal.

According to an embodiment, the piezoelectric transducer element comprises a second transducer region, and wherein the control circuitry is configured to readout the first sensor signal from the first region of the piezoelectric transducer element based on a deflection of the deflectable structure, to determine the control signal from the first sensor signal, and to provide the control signal to the second transducer region of the piezoelectric transducer element for counteracting the deflection of the deflectable structure.

According to an embodiment, the control circuitry is configured to apply a reference signal to a counter electrode.

According to an embodiment, the control circuitry is configured to readout the first sensor signal from the first region of the piezoelectric transducer element based on a deflection of the deflectable structure, to determine the control signal from the first sensor signal, and to provide the control signal to the first transducer region of the piezoelectric transducer element for counteracting the deflection of the deflectable structure, wherein the control circuitry is configured to toggle between the reading out at least the first sensor signal from the first region of the piezoelectric transducer element and the providing the control signal to the first transducer region.

According to an embodiment, the control circuitry is configured to conduct the toggling in a MHz domain.

According to an embodiment, the control circuitry is configured to apply a reference signal to a counter electrode.

According to an embodiment, the piezoelectric transducer element comprises a second transducer region, and wherein the control circuitry is configured to readout the first sensor signal from the first region of the piezoelectric transducer element and the second sensor signal from the second region of the piezoelectric transducer element based on a deflection of the deflectable structure, to determine the control signal from the readout first and the second sensor signal, and to provide the control signal to a counter electrode of the piezoelectric transducer element for counteracting the deflection of the deflectable structure.

According to an embodiment, the first transducer region comprises a piezoelectric material between a first readout terminal and a counter electrode and the second transducer region comprises a further piezoelectric material between a second readout terminal and the counter electrode, wherein the piezoelectric material between the first readout terminal and the counter electrode and the further piezoelectric material between the second readout terminal and the counter electrode comprise an opposite pre-polarization.

According to an embodiment, a method for operating a MEMS device is provided. The MEMS device comprises a piezoelectric transducer element having at least a first piezoelectric transducer region, a deflectable structure, wherein the deflectable structure comprises the piezoelectric transducer element, and a control circuitry, the method comprising the following steps performed by the control circuitry: reading out at least a first sensor signal from the first region of the piezoelectric transducer element based on a deflection of the deflectable structure, determining a control signal from at least the readout first sensor signal, wherein the control signal has a counteracting effect to the deflection of the deflectable structure when provided to the piezoelectric transducer element, and providing the control signal to the piezoelectric transducer element for counteracting the deflection of the deflectable structure.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Depending on certain implementation requirements, embodiments of the control circuitry can be implemented in hardware or in software or at least partially in hardware or at least partially in software. Generally, embodiments of the control circuitry can be implemented as a computer program product with a program code, the program code being operative for performing one of the methods when the computer program product runs on a computer. The program code may for example be stored on a machine readable carrier.

In the foregoing detailed description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the detailed description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

What is claimed is:

1. A micro-electro-mechanical system (MEMS) device comprising:
    a piezoelectric transducer element having a first transducer region and a second transducer region;
    a deflectable structure comprising the piezoelectric transducer element; and
    a control circuit configured to:
        readout a first sensor signal from the first transducer region of the piezoelectric transducer element based on a deflection of the deflectable structure;
        determine a control signal from the readout first sensor signal, wherein the control signal has a counteracting effect on the deflection of the deflectable structure when provided to the piezoelectric transducer element;
        provide the control signal to the first transducer region of the piezoelectric transducer element for counteracting the deflection of the deflectable structure; and
        toggle between reading out the first sensor signal from the first transducer region of the piezoelectric transducer element and providing the control signal to the first transducer region of the piezoelectric transducer element,
    wherein the first transducer region comprises a piezoelectric material disposed between a first readout terminal and a counter electrode, and
    wherein the second transducer region comprises the piezoelectric material disposed between a second readout terminal and the counter electrode.

2. The MEMS device of claim 1, wherein the control circuit is configured to perform toggling in a MHz domain.

3. A micro-electro-mechanical system (MEMS) device comprising:
    a piezoelectric transducer element having a first transducer region and a second transducer region;
    a deflectable structure comprising the piezoelectric transducer element; and
    a control circuit configured to:
        readout a first sensor signal from the first transducer region of the piezoelectric transducer element based on a deflection of the deflectable structure;
        determine a control signal from the readout first sensor signal, wherein the control signal has a counteracting effect on the deflection of the deflectable structure when provided to the piezoelectric transducer element; and
        provide the control signal to the piezoelectric transducer element for counteracting the deflection of the deflectable structure,
    wherein the first transducer region comprises a piezoelectric material disposed between a first readout terminal and a counter electrode, and
    wherein the second transducer region comprises the piezoelectric material disposed between a second readout terminal and the counter electrode.

4. The MEMS device of claim 3, wherein the control circuit comprises a feedback control loop configured to derive the control signal from the readout first sensor signal and to apply the control signal to the piezoelectric transducer element.

5. The MEMS device of claim 3, wherein the control circuit comprises a feedback control loop configured to provide the control signal as a time dependent signal to the piezoelectric transducer element to actively dampen the deflection of the deflectable structure.

6. The MEMS device of claim 4, wherein the control circuit comprises an analog front end (AFE) circuit configured to read out the first sensor signal in an analog manner and to provide a processed analog signal to the feedback control loop for determining the control signal.

7. The MEMS device of claim 3, wherein:
    the control signal comprises information indicative of the deflection of the deflectable structure; and
    the control circuit is further configured to:
        derive an output signal of the MEMS device from the control signal, and
        provide the output signal having information on an amplitude and frequency of the deflection of the deflectable structure.

8. The MEMS device of claim 3, wherein the control circuit is further configured to:
    provide, to the piezoelectric transducer element, a test signal configured to cause a deflection of the deflectable structure;
    readout a test response signal from the first transducer region of the piezoelectric transducer element based on the deflection of the deflectable structure caused by the test signal; and
    adapt, based on the test response signal, parameters that form a basis for determining the control signal.

9. The MEMS device of claim 3, wherein:
    the piezoelectric transducer element comprises a second transducer region; and
    the control circuit is configured to provide the control signal to the second transducer region of the piezoelectric transducer element for counteracting the deflection of the deflectable structure.

10. The MEMS device of claim 9, wherein the control circuit is configured to apply a reference signal to the counter electrode.

11. The MEMS device of claim 3, wherein the control circuit is configured to apply a reference signal to the counter electrode.

12. A method for operating a MEMS device comprising a piezoelectric transducer element having a first transducer region and a second transducer region, a deflectable structure comprising the piezoelectric transducer element, and a control circuit, the method comprising:
- reading out, by the control circuit, a first sensor signal from the first transducer region of the piezoelectric transducer element based on a deflection of the deflectable structure;
- determining, by the control circuit, a control signal from at least the readout first sensor signal, wherein the control signal has a counteracting effect on the deflection of the deflectable structure when provided to the piezoelectric transducer element;
- providing, by the control circuit, the control signal to the first transducer region of the piezoelectric transducer element for counteracting the deflection of the deflectable structure; and
- wherein the first transducer region comprises a piezoelectric material disposed between a first readout terminal and a counter electrode, and
- wherein the second transducer region comprises the piezoelectric material disposed between a second readout terminal and the counter electrode.

13. The method of claim 12, further comprising:
- deriving, by a feedback control loop, the control signal from at least the readout first sensor signal; and
- applying, by the feedback control loop, the control signal to the piezoelectric transducer element.

14. The method of claim 12, further comprising:
- actively dampening the deflection of the deflectable structure by providing, via a feedback control loop, the control signal as a time dependent signal to the piezoelectric transducer element.

15. The method of claim 14, further comprising:
- reading out, by an analog front end (AFE) the first sensor signal in an analog manner; and
- providing a processed analog signal to the feedback control loop for determining the control signal.

16. The method of claim 12, wherein:
- the control signal comprises information indicative of the deflection of the deflectable structure; and
- the method further comprises:
  - deriving, by the control circuit, an output signal of the MEMS device from the control signal, and
  - providing, by the control circuit, the output signal having information on an amplitude and frequency of the deflection of the deflectable structure.

17. The method of claim 12,
further comprising providing, by the control circuit, the control signal to the second transducer region of the piezoelectric transducer element for counteracting the deflection of the deflectable structure.

18. A micro-electro-mechanical system (MEMS) device comprising:
- a piezoelectric transducer element having a first transducer region;
- a deflectable structure comprising the piezoelectric transducer element; and
- a control circuit configured to:
  - readout a first sensor signal from the first transducer region of the piezoelectric transducer element and a second sensor signal from a second transducer region of the piezoelectric transducer element based on a deflection of the deflectable structure;
  - determine a control signal from the readout first and second sensor signals, wherein the control signal has a counteracting effect on the deflection of the deflectable structure when provided to the piezoelectric transducer element; and
  - provide the control signal to a counter electrode of the piezoelectric transducer element for counteracting the deflection of the deflectable structure,
- wherein the first transducer region comprises a first piezoelectric material between a first readout terminal and the counter electrode,
- wherein the second transducer region comprises a second piezoelectric material between a second readout terminal and the counter electrode, and
- wherein the first piezoelectric material between the first readout terminal and the counter electrode and the second piezoelectric material between the second readout terminal and the counter electrode comprise an opposite pre-polarization.

19. The MEMS device of claim 18, wherein the same type of strain is configured to cause opposite voltage signals at the first and second readout terminals.

20. The MEMS device of claim 18, wherein:
- the control signal comprises information indicative of the deflection of the deflectable structure; and
- the control circuit is further configured to:
  - derive an output signal of the MEMS device from the control signal, and
  - provide the output signal having information on an amplitude and frequency of the deflection of the deflectable structure.

21. The MEMS device of claim 18, wherein the control circuit is configured to apply a reference signal to the counter electrode.

* * * * *